(12) United States Patent
Jones

(10) Patent No.: US 7,393,513 B2
(45) Date of Patent: Jul. 1, 2008

(54) SYSTEM AND PROCESS FOR TREATING SULFUR

(75) Inventor: Ronald E. Jones, Friendswood, TX (US)

(73) Assignee: S&B Engineers and Constructors, Ltd., Houston, TX (US)

( * ) Notice: Subject to any disclaimer, the term of this patent is extended or adjusted under 35 U.S.C. 154(b) by 629 days.

(21) Appl. No.: 10/652,385

(22) Filed: Aug. 29, 2003

(65) Prior Publication Data

US 2004/0241083 A1    Dec. 2, 2004

Related U.S. Application Data

(60) Provisional application No. 60/474,842, filed on Jun. 2, 2003.

(51) Int. Cl.
*B01D 53/52* (2006.01)

(52) U.S. Cl. .................................. 423/242.1

(58) Field of Classification Search .............. 423/242.1; 23/295 S
See application file for complete search history.

(56) References Cited

U.S. PATENT DOCUMENTS

| | | | |
|---|---|---|---|
| 3,532,468 A | 10/1970 | Beavon | |
| 3,935,244 A | 1/1976 | Hayes | |
| 4,248,717 A | 2/1981 | Sharp et al. | |
| 4,290,900 A | 9/1981 | Sharp et al. | |
| 4,304,570 A | 12/1981 | Kleeberg et al. | |
| 4,465,845 A | 8/1984 | Okamoto et al. | |
| 4,684,514 A | 8/1987 | Chen | |
| 4,776,860 A | 10/1988 | Najjar et al. | |
| 4,781,910 A * | 11/1988 | Van Dijk | 423/221 |
| 4,919,912 A | 4/1990 | Taggart et al. | |
| 5,015,459 A | 5/1991 | Pendergraft | |
| 5,057,298 A * | 10/1991 | Ray et al. | 423/574.2 |
| 5,130,112 A | 7/1992 | McAlister et al. | |
| 5,139,764 A | 8/1992 | Szekely | |
| 5,141,733 A | 8/1992 | Pendergraft | |
| 5,271,907 A | 12/1993 | Copeland | |
| 5,632,967 A | 5/1997 | Nasato | |
| 5,661,299 A | 8/1997 | Purser | |
| 5,851,262 A | 12/1998 | Mukai | |
| 6,099,819 A | 8/2000 | Srinivas et al. | |
| 6,120,581 A | 9/2000 | Markovs et al. | |
| 6,165,436 A | 12/2000 | Dezael et al. | |
| 6,497,745 B2 | 12/2002 | Marsden et al. | |
| 2002/0021994 A1 | 2/2002 | Blue et al. | |
| 2003/0086849 A1 | 5/2003 | Marsden et al. | |

FOREIGN PATENT DOCUMENTS

| | | |
|---|---|---|
| CA | 1118963 | 9/1981 |
| CA | 1261118 | 8/1987 |
| CA | 2026555 | 5/1991 |
| CA | 2232629 | 5/1997 |
| EP | 0212297 | 8/1987 |
| JP | 1026140 | 1/1989 |
| JP | 2001081440 | 3/2001 |
| RU | 2196804 | 1/2003 |
| WO | WO08002721 | 9/1981 |
| WO | WO9711028 | 3/1997 |
| WO | WO0015734 | 3/2000 |
| WO | WO0208474 | 1/2002 |
| ZA | 8605421 | 8/1987 |

* cited by examiner

*Primary Examiner*—Edward M Johnson
(74) *Attorney, Agent, or Firm*—Conley Rose, P.C.

(57) ABSTRACT

A process for treating sulfur at elevated pressures by which the sulfur may be separated from a process gas in a separation vessel, sent to one or more transfer vessels, and the transfer vessel(s) vented to depressurize the sulfur to near atmospheric pressure. The sulfur may subsequently be transferred to ambient storage or other desirable use. The sulfur exiting the separation vessel may also be transferred to an intermediate vessel. The rate of transfer of the sulfur throughout the process may be controlled by controlling the pressure differentials between the various vessels.

22 Claims, 3 Drawing Sheets

SYSTEM AND PROCESS FOR TREATING SULFUR

REFERENCE TO RELATED APPLICATIONS

This application claims priority to U.S. Patent Application No. 60/474,842 filed Jun. 2, 2003, incorporated herein by reference for all purposes.

STATEMENT REGARDING FEDERALLY SPONSORED RESEARCH OR DEVELOPMENT

Not applicable.

BACKGROUND

Natural gas, as it comes from the ground, may contain impurities. One impurity that is often found in natural gas is sulfur, particularly sulfur in the form of $H_2S$. It may be desirable to remove the sulfur from a natural gas stream because, for example, it may prematurely corrode pipelines and it also may act as a poison to catalysts in downstream processes. One method of removing sulfur from a natural gas process is the Claus Process. The Claus Process generally consists of several steps: (1) oxidizing a portion of the $H_2S$ to form some elemental sulfur and some $SO_2$ and (2) reacting some of the remaining $H_2S$ and $SO_2$ to form elemental sulfur and water. The sulfur produced in the Claus Process is generally produced at near atmospheric pressure (e.g., less than about 15 psig).

Another method of removing sulfur from a gas stream is through the direct partial oxidation of the $H_2S$ to produce water and elemental sulfur. Generally, in this partial oxidation process, a stream containing up to about 3% $H_2S$ is partially oxidized over a catalyst to produce, inter alia, elemental sulfur at elevated pressures (e.g., greater than about 15 psig). See generally, U.S. Pat. Nos. 5,271,907 and 6,099,819, incorporated herein by reference. The methods of processing sulfur at near atmospheric pressure may not work properly when handling elemental sulfur at elevated pressures. Additionally, other high pressure treatment processes may be capital intensive, may require many moveable parts, which may require frequent maintenance and/or possibly expose workers and operators to high pressure sulfur. Thus, there is a need for a process for processing sulfur at elevated pressures which alleviates or eliminates one or more of these concerns.

SUMMARY

Disclosed herein is a process for treating sulfur at elevated pressures wherein the sulfur may be separated from the process gas, sent to a transfer vessel, and the transfer vessel is vented to depressurize the sulfur to near atmospheric pressure. The sulfur may then be transferred to ambient storage or any other desirable use.

DETAILED DESCRIPTION

Figure 1:
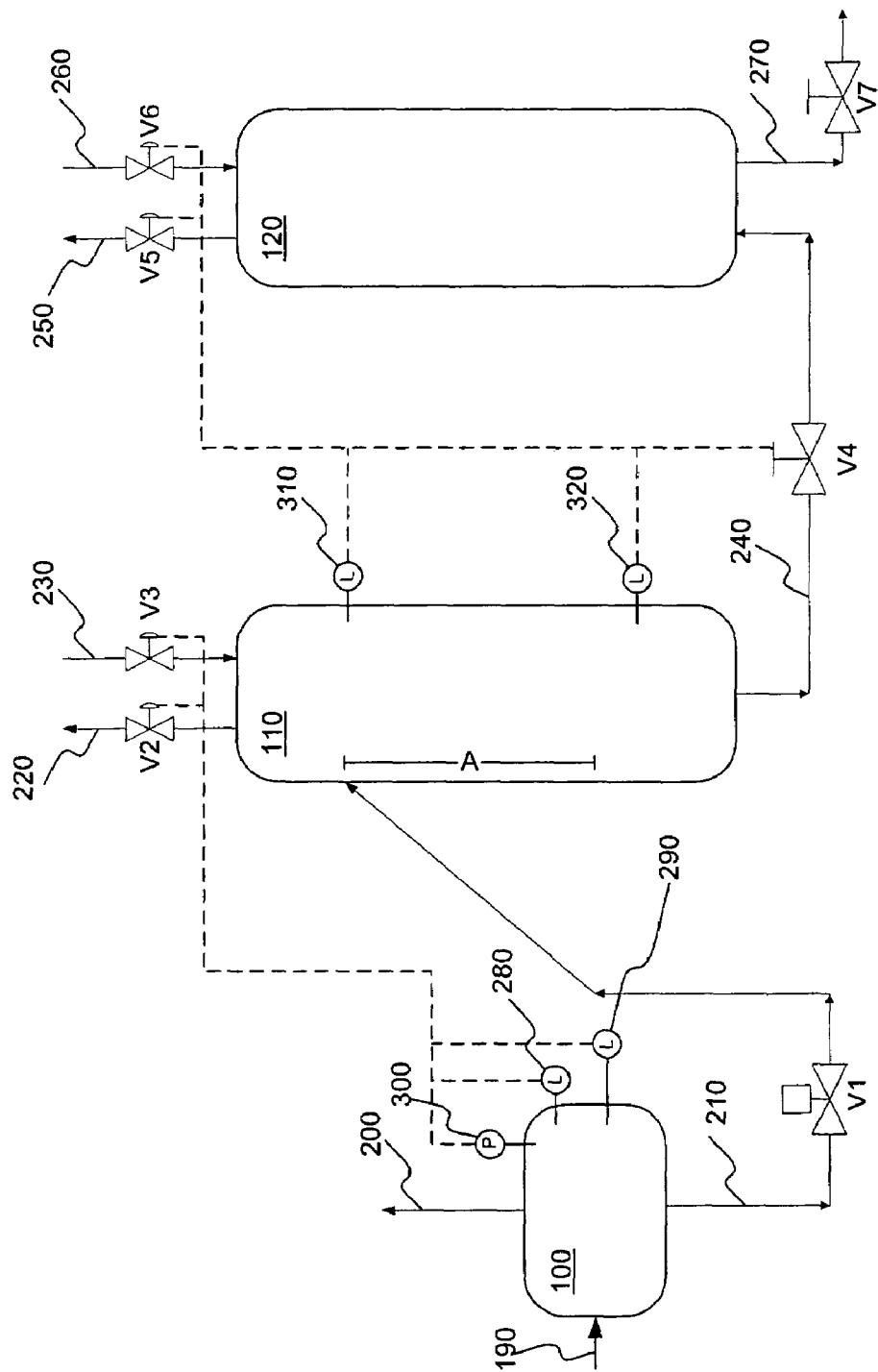
FIG. 1 is a schematic drawing of a system for treating sulfur in accordance with embodiments of the present invention.

Referring now to FIG. 1, there is shown a system comprising a product separator 100, a pressurized sulfur storage vessel 110, a sulfur transfer vessel 120, and valves V1, V2, V3, V4, V5, V6, and V7. In operation, sulfur and process gas (e.g., $H_2O$ and/or $H_2$) at elevated pressure (e.g., above about 15 psig) flow continuously or semi-continuously into process separator 100 through inlet line 190. Most of the process gas exits separator 100 through gas outlet 200. Likewise, most of the sulfur exits separator 100 through sulfur outlet 210, through valve V1 and into sulfur storage vessel 110.

At steady state, the pressure of storage vessel 110 is maintained equal to the pressure of separator 100 (e.g., about 70 psig) less the hydrostatic head of the sulfur as it rises through elevation A before entering storage vessel 110. In some embodiments the pressure of storage vessel 110 may be about 65 psig. Elevation A may be adjusted as desired to provide the desired pressure drop between vessels 100 and 110. In some embodiments, elevation A may be about 7.7 feet. Pressurized gas may be injected or released through gas lines 230 and 220 respectively so as to maintain the desired pressure in storage vessel 110. For example, an automatic or manual level control sensors 280 and 290 may be introduced into vessel 100. If the level of sulfur in separator 100 increases above a desired level, as indicated by level sensor 280, valve V2 may be opened and gas released to decrease the pressure in vessel 110, thereby increasing the flow rate of sulfur from the separator through sulfur line 210. Likewise, if the level of sulfur in separator 100 decreases below a desired level, as indicated by level sensor 290, valve V3 may be opened and gas injected so as to increase the pressure in vessel 110, thereby decreasing the flow rate of sulfur from the separator through sulfur line 210. Similarly, if the operating pressure in separator 100 changes, as indicated by pressure sensor 300 it may be necessary to increase or decrease the pressure in vessel 110 correspondingly.

As the level of sulfur in storage vessel 110 reaches a desired level, as indicated, e.g., by level sensor 310, the pressure in transfer vessel 120 may be increased (automatically by a control device or manually) to just below that of storage vessel 110. For example, if storage vessel 110 is at 100 psig, transfer vessel 120 may be brought to, e.g., 50 psig (via, e.g., high pressure gas line 260) and valve V4 opened to allow sulfur to flow from storage vessel 110 to transfer vessel 120. Additionally, vessel 120 may be vented through, e.g., valve V5 as vessel 120 is filled. Valve V4 can be closed when the sulfur level in vessel 110 reaches a desired lower level (e.g., its minimum safe operating level). This closure of valve V4 can occur manually or via an automated device that closes V4 in response to a signal from a level indicator 320 in vessel 110. Once the sulfur has been transferred from vessel 110 into transfer vessel 120 and valve V4 has been closed, the pressure in vessel 120 may be reduced to near atmospheric pressure (e.g., through gas release line 250) and the sulfur transferred to atmospheric or near atmospheric storage (e.g., 0 to about 5 psig) through sulfur removal line 270. Once the sulfur level in vessel 120 reaches its desired lower level, valve V7 may be closed and vessel 120 may then be repressurized to receive sulfur from storage vessel 110, and the sequence may be repeated. The closure and repressurization may be manual or automatic via a control device. In some embodiments, sulfur production may be about 10 tons/day.

In some embodiments, either or both of vessels 110 and 120 may have a diameter of about 4 feet and a height of about 20 feet.

Figure 2:
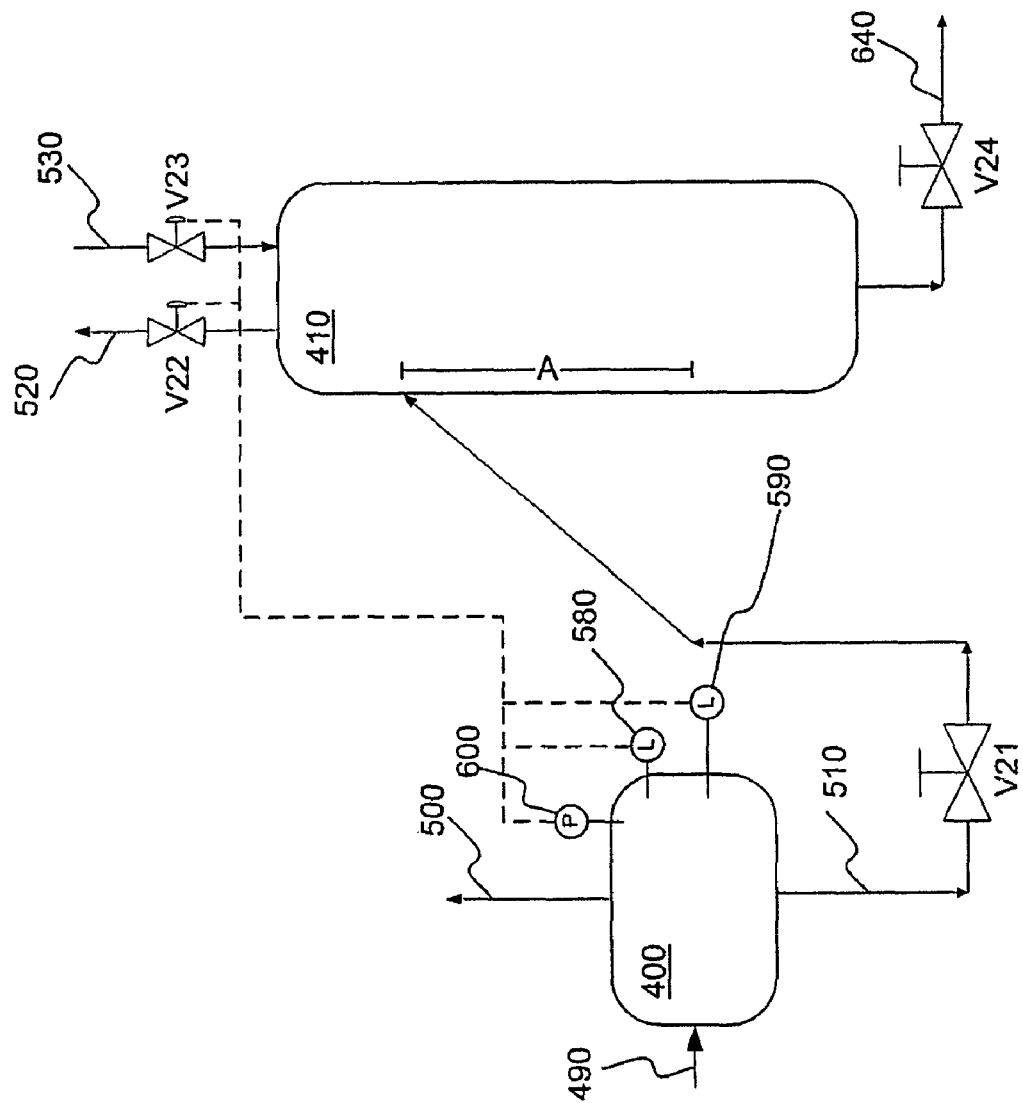
FIG. 2 is a schematic drawing of a second system for treating sulfur in accordance with embodiments of the present invention.

Referring now to FIG. 2, there is shown a separator 400, a sulfur transfer vessel 410, and valves V21, V22, V23, and V24. In operation, sulfur and process gas (e.g., $H_2O$ and/or $H_2$) at elevated pressure (e.g., above about 15 psig) flow continuously or semi-continuously into process separator 400 through inlet line 490. Most of the process gas exits separator 400 through gas outlet 500. Likewise, most of the sulfur exits separator 400 through sulfur outlet 510, through valve V21 and into sulfur storage vessel 410.

In operation, when the sulfur level of separator 400 reaches the desired level, valve 21 may be opened to allow sulfur to flow from separator 400 to vessel 410. During transfer of sulfur from separator 400 to vessel 410, it is desirable to keep the pressure of vessel 410 just below that of separator 400. Pressurized gas may be injected or released through gas lines 530 and 520 respectively so as to maintain the desired pressure in storage vessel 410. So long as the pressure of vessel 410 is less than the pressure of separator 400 less the hydrostatic head of the sulfur in transfer line 510, sulfur will flow from separator 400 to vessel 410. For example, automatic or manual level control sensors 580 and 590 maybe introduced into vessel 400. If the level of sulfur in separator 400 increases above a desired level, as indicated by level sensor 580, valve V22 may be opened and gas released to decrease the pressure in vessel 410, thereby increasing the flow rate of sulfur from the separator through sulfur line 510. Likewise, if the level of sulfur in separator 400 decreases below a desired level, as indicated by level sensor 590, valve V23 may be opened and gas injected so as to increase the pressure in vessel 410, thereby decreasing the flow rate of sulfur from the separator through sulfur line 510. Similarly, if the operating pressure in separator 400 changes, as indicated by pressure sensor 600 it may be necessary to increase or decrease the pressure in vessel 410 correspondingly.

As the level of sulfur in vessel 410 reaches a desired level, valve V21 may be closed and the pressurized sulfur in vessel 410 vented through gas release line 520 to the desired pressure (e.g., atmospheric) and the sulfur transferred to atmospheric or near atmospheric storage (e.g., 0 to about 5 psig) through sulfur removal line 640. Once the sulfur level in vessel 410 reaches its desired lower level, valve V24 may be closed and vessel 410 may then be repressurized to receive sulfur from separator 400, and the sequence may be repeated. The closure and repressurization may be manual or automatic via a control device.

Figure 3:
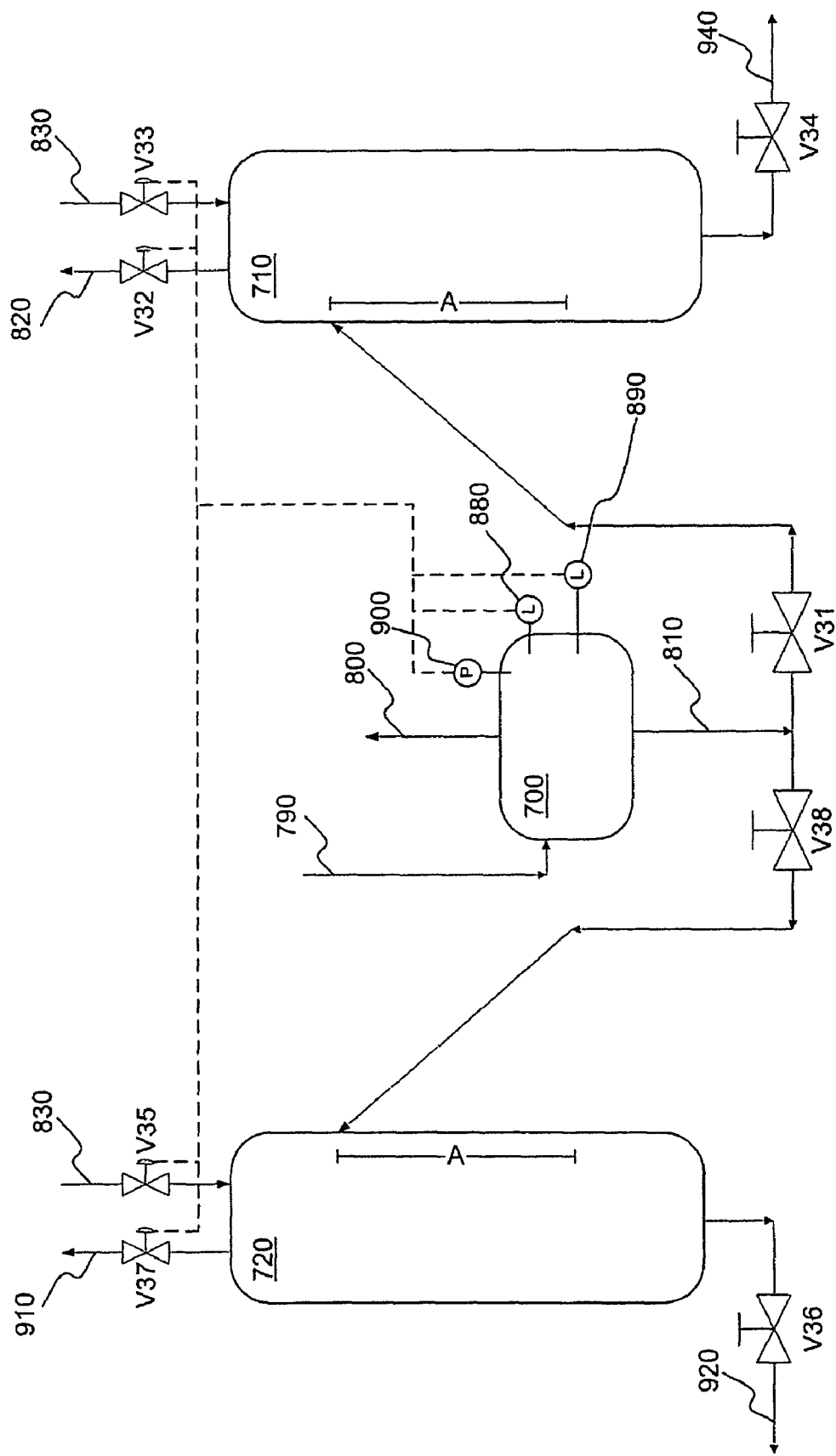
FIG. 3 is a schematic drawing of a third system for treating sulfur in accordance with embodiments of the present invention.

Referring now to FIG. 3, there is shown an embodiment in which two transfer vessels may be operated alternately in parallel. There is shown separator 700, first transfer vessel 710, second transfer vessel 720, and valves V31, V32, V33, V34, V35, V36, V37, and V38. In short, one vessel is filled with sulfur from separator 700, the valve between the filled vessel and the separator is closed, and the sulfur in the filled vessel is vented to the desired pressure (i.e., atmospheric or near atmospheric). Once the pressure of the sulfur is reduced as desired, the sulfur can be transferred to its destination (e.g., storage or a process). For the purpose of this disclosure, vessel 720 will be filled first, however, the order of the steps may be changed such that another vessel is filled first. Additionally, in some embodiments, it may be desirable to allow sulfur to transfer to both vessels simultaneously. p In operation, sulfur and process gas are injected into separator 700, sulfur exits separator 700 trough sulfur outlet 810 and gas exits through gas outlet 800. Valves V38 is open and the pressure of vessel 720 may be just below that of the separator 700 less the hydrostatic head of the sulfur flowing from the separator 700 to vessel 720. The flow of sulfur flowing from separator 700 to vessel 720 may be controlled by controlling the pressure in vessel 720 by injecting or venting gas through valves V35 or V37 respectively. To increase the rate of sulfur transfer, gas may be vented. Conversely, to decrease the rate of sulfur transfer, high pressure gas may be injected. Once the amount of sulfur in vessel 720 reaches its desired upper level, valve V38 is closed, valve V31 is opened, and the high pressure sulfur in vessel 720 is vented until the sulfur reaches its desired pressure. The sulfur may then be transferred to storage or any other desirable use. While the sulfur in vessel 720 is brought to atmospheric pressure, vessel 710 may be filled with sulfur from separator 700, and the same process repeated.

The above discussion is meant to be illustrative of the principles and various embodiments of the present invention. Numerous variations and modifications will become apparent to those skilled in the art once the above disclosure is fully appreciated. For example, the embodiments of FIG. 1 and/or FIG. 3 may be modified to include 3 or more vessels. It is intended that the following claims be interpreted to embrace all such variations and modifications.

What is claimed is:

1. A method for treating sulfur at elevated pressures, the method comprising:
   introducing a stream comprising sulfur and process gas into a separator at a pressure greater than about 15 psig, wherein the separator comprises an inlet for the stream comprising sulfur and process gas, an outlet for process gas, and a separator sulfur outlet for a stream consisting essential of sulfur;
   providing a first vessel comprising a first vessel sulfur inlet, a first vessel sulfur outlet, a pressurizing gas inlet, and a depressurizing gas outlet, wherein the first vessel is in fluid communication with the separator via a first transfer line which connects the separator sulfur outlet to the first vessel sulfur inlet whereby the first vessel sulfur inlet is elevated an elevation relative to the separator sulfur outlet;
   separating a stream consisting essentially of sulfur from the stream comprising sulfur and process gas in the separator;
   transferring at least a portion of the sulfur at elevated pressure from the separator up the elevation to the first vessel, whereby the first vessel contains essentially sulfur; whereby transfer of the sulfur from the separator to the first vessel is effected by maintaining the pressure of the first vessel at a pressure less than the pressure of the separator less the hydrostatic head of sulfur in the first transfer line during sulfur transfer by injecting gas through the pressurizing gas inlet or releasing gas through the depressurizing gas outlet;
   isolating the first vessel from the separator; and
   venting the first vessel containing the at least a portion of the sulfur to reduce the pressure of the sulfur.

2. The method of claim 1 wherein the pressure of the sulfur is reduced to ambient pressure.

3. The method of claim 2 further comprising transferring at least a portion of the sulfur to ambient storage after reducing the pressure.

4. The method of claim 1 further comprising transferring at least a portion of the separated sulfur from the separator up an elevation to a second vessel, wherein the second vessel is in fluid communication with the separator via a second transfer line which introduces sulfur from a separator sulfur outlet up an elevation to a sulfur inlet of the second vessel; wherein the second vessel pressure is controlled such that the second vessel pressure is less than the separator pressure less the hydrostatic head of the sulfur in the second transfer line during sulfur transfer.

5. The method of claim 4 further comprising:
   isolating the contents of the second vessel from the separator, and
   venting the second vessel to reduce the pressure of the sulfur in the second vessel.

6. The method of claim 5 further comprising operating the first vessel and the second vessel alternatively.

7. The method of claim 1 wherein the elevated pressure is greater than 50 psig.

8. The method of claim 1 wherein the elevated pressure is greater than 70 psig.

9. A method for treating sulfur at elevated pressures, the method comprising:
   introduction a stream comprising sulfur and process gas into a separator at a pressure greater than about 15 psig, wherein the separator has an inlet for the stream comprising sulfur and process gas, an outlet for process gas, and an separator sulfur outlet for a stream consisting essentially of sulfur;
   providing an intermediate vessel in fluid communication with the separator via a first transfer line which fluidly connects the separator sulfur outlet up an elevation to a sulfur inlet of the intermediate vessel whereby the sulfur inlet of the intermediate vessel is elevated relative the separator sulfur outlet;
   separating a stream consisting essentially of sulfur from the stream comprising sulfur and process gas in the separator;
   transferring at least a portion of the separated sulfur at elevated pressure from the separator up the elevation to the intermediate vessel whereby the intermediate vessel contains essentially sulfur; whereby transfer of the sulfur from the separator to the intermediate vessel is effected by maintaining the pressure of the intermediate vessel at a pressure less than the pressure of the separator less the hydrostatic head of sulfur in the first transfer line during sulfur transfer;
   transferring at least a portion of the sulfur in the intermediate vessel from the intermediate vessel to a first vessel;
   isolating the first vessel from the intermediate vessel; and
   venting the first vessel containing the at least a portion of the sulfur to reduce the pressure of the sulfur.

10. The method of claim 9 wherein the intermediate vessel further comprises a pressurizing gas inlet and a depressurizing gas outlet and wherein the rate of transfer of sulfur from the separator to the intermediate vessel is controlled by controlling the pressure in the intermediate vessel by injecting gas through the pressurizing gas inlet or releasing gas through the depressurizing gas outlet.

11. The method of claim 10 wherein the relative elevation is greater than 5 feet.

12. The method of claim 11 wherein the relative elevation is no less than 7 feet and no more than 8 feet.

13. A method for receiving molten sulfur, comprising the steps of:
   providing a separation tank that receives a stream containing molten sulfur and separates at least a portion of the molten sulfur from the stream, said separation tank having a first pressure therein of at least 15 psig and an overhead space;
   transferring at least a portion of the separated molten sulfur to a short-term sulfur storage tank through a liquid riser, to yield a fluid-filled liquid riser, said fluid-filled liquid riser having a head of sulfur and said short-term sulfur storage tank having a second pressure that is less than the pressure in the separation tank by a pressure differential at least as great as the head of molten sulfur during transfer, such that the rate of transfer of sulfur from the separation tank to the short-term storage tank is controlled by the pressure differential.

14. The method according to claim 13, further comprising the step of transferring at least a portion of the short-term sulfur storage tank contents into a third tank, isolating the contents of the third tank, reducing the pressure in the third tank, and transferring at least a portion of the sulfur from the third tank.

15. The method according to claim 13, further including measuring the first pressure and the second pressure and controlling the second pressure in response to the first pressure, the second pressure, or both.

16. The method according to claim 13, further including controlling the rate of sulfur transfer from the separation tank to the storage tank by controlling the second pressure.

17. The method according to claim 13, further including providing a fluid source for increasing said second pressure and a fluid vent for decreasing said second pressure and controlling the rate of fluid transfer from the separation tank to the short-term sulfur storage tank by controlling the flow of fluid through the fluid source and the fluid vent.

18. The method according to claim 17 wherein the fluid source and the fluid vent comprise gas lines.

19. The method according to claim 17 wherein the fluid source comprises a gas line in fluid communication with the overhead space of the short-term sulfur storage tank.

20. The method according to claim 13 wherein the pressure in the separation tank is at least 100 psig.

21. The method according to claim 13 wherein the pressure in the separation tank is at least 500 psig.

22. The method according to claim 13 wherein the pressure in the separation tank is at least 1000 psig.

* * * * *